April 28, 1931. W. MESSERSCHMITT 1,802,438
CONNECTION BETWEEN THE LONGITUDINAL AND TRANSVERSE
BRACING MEMBERS IN HOLLOW BODIES FOR AIRCRAFT
Filed July 15, 1929 2 Sheets-Sheet 1

April 28, 1931. W. MESSERSCHMITT 1,802,438
CONNECTION BETWEEN THE LONGITUDINAL AND TRANSVERSE
BRACING MEMBERS IN HOLLOW BODIES FOR AIRCRAFT
Filed July 15, 1929 2 Sheets-Sheet 2

Inventor:
Willy Messerschmitt,

Patented Apr. 28, 1931

1,802,438

UNITED STATES PATENT OFFICE

WILLY MESSERSCHMITT, OF AUGSBURG, GERMANY

CONNECTION BETWEEN THE LONGITUDINAL AND TRANSVERSE BRACING MEMBERS IN HOLLOW BODIES FOR AIRCRAFT

Application filed July 15, 1929, Serial No. 378,395, and in Germany July 16, 1928.

This invention relates to a connection between the longitudinal and transverse bracing members in hollow bodies for aircraft.

One object of the invention is to improve and to simplify the connections of that kind hitherto employed.

According to the invention, such a connection is effected by providing the longitudinal bracing members, at the junction points between the same and the transverse bracing members, with slots, and the transverse bracing members with projecting lugs which are pushed through the corresponding slots of the longitudinal bracing members and secured at the side of the longitudinal bracing, which is opposite the transverse bracing. This securing at the opposite side of the longitudinal bracing may be effected by bending there the lugs pushed through and riveting them to the adjoining side of the longitudinal bracing.

In the application to the building-up of aircraft wings and guide surfaces, the arrangement could be made so that the ribs of the aircraft wings or guide surfaces are provided with lugs which are pushed through one or more slots in the spar plate and secured to angle irons laterally arranged on the spar. The slots in the spar plate may extend from top to the bottom or be limited only to a short length, and the ribs may also be built up of parts.

A special advantage of the construction described is that the single parts of the aircraft wings or other hollow spaces such as for instance a completely covered or plated tip rib box can be placed at once on the spar and connected to it.

Figure 1:
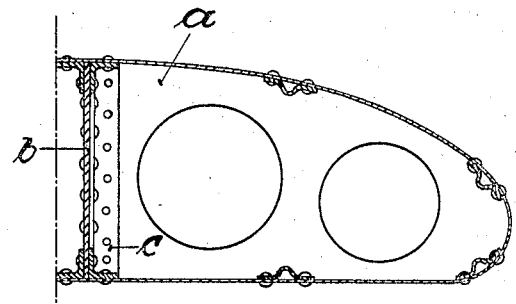
Figure 1:
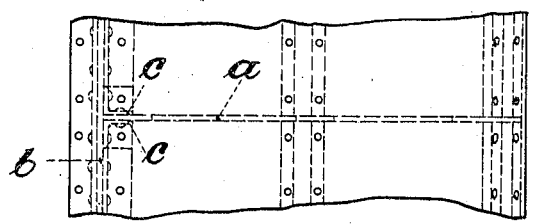
Figure 2:
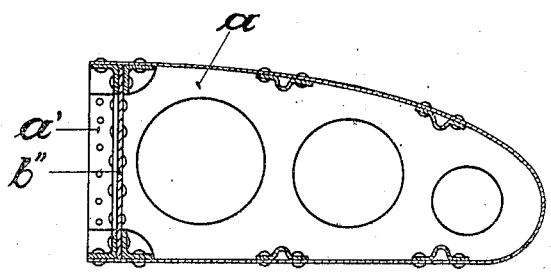
Figure 2:
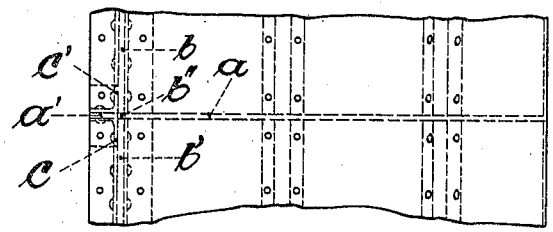
Figure 3:
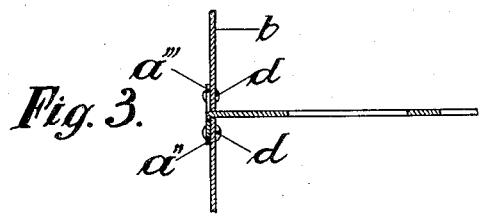
Figure 4:
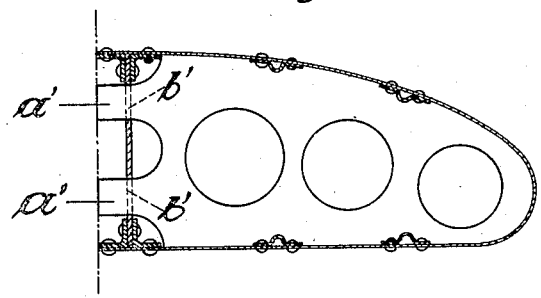

Several constructions according to the invention are shown by way of example in the accompanying drawing in which:

Figure 1 shows the manufacture of such a connection between the longitudinal and transverse bracing members of the formerly usual kind, Figure 2 a construction of the new method of connection, Figure 3 a second method of making it, Figure 4 a third method in diagrammatic form.

In the method which was formerly in general use (compare Figure 1), the securing was effected either by bending the ribs $a$ on the lattice or sheet metal spar $b$ and riveted, or riveted to previously secured angle irons $c$. The ribs are also pushed as a whole over the spar and connected to the same. The chief drawbacks of this construction are that the ribs have to be secured to the spar before the plating is effected.

In the construction according to the invention illustrated in Figure 2, the longitudinal spar $b$ is provided at the point where the transverse rib $a$ is to be secured to it, with a vertical slot which passes right through the spar metal plate $b'$. The rib $a$ is provided with a projecting lug $a'$ which is so large that it can just be pushed through the slot $b''$. The securing of the parts together in the construction according to Figure 2 consists in angle irons $c, c'$ being arranged on the face of the spar $b$ away from the rib $a$ at both sides of the slot and riveted with one flange to the spar plate $b''$ and with the other to the lug $a'$ of the rib $a$ In the construction according to Figure 3, the lug is subdivided by horizontal cuts into several single lugs $a''$ and $a'''$ which are turned to both sides flat against the spar plate $b''$ and secured to it by rivets $d$.

In the construction according to Figure 4, the spar is provided with several slots $b'$ through which are passed the tooth shaped lugs $a'$. They can be secured in the same way as in the constructions according to Figure 2 and Figure 3.

What I claim is:

A connection between the longitudinal and transverse bracing members in hollow bodies for aircraft, in which the longitudinal bracing member is provided at the junction with the transverse member with a slot, including angle irons fixed on the longitudinal member adjacent the slot, the transverse bracing member being provided with a projecting lug adapted to be passed through the said slot, and means to secure the projecting end of said lug to said angle irons.

In testimony whereof I have signed my name to this specification.

WILLY MESSERSCHMITT.